UNITED STATES PATENT OFFICE.

WILLIAM GREEN, OF NEW ORLEANS, LOUISIANA.

IMPROVEMENT IN PROCESSES OF PRESERVING THE STUBBLE OF SUGAR-CANE FROM DECAY.

Specification forming part of Letters Patent No. 143,622, dated October 14, 1873; application filed June 30, 1873.

*To all whom it may concern:*

Be it known that I, WILLIAM GREEN, of the city of New Orleans, parish of Orleans and State of Louisiana, have made certain new and useful Improvements in a Mode of Preserving the Stalks of Sugar-Cane; and I hereby declare the following to be a full, clear, and correct description of the same.

My improvement consists in a particular mode of treating what is technically known throughout the sugar-producing countries of the southern States as the "stubble" of sugar-cane, with a view to its protection during the cold or winter season of the year, during which time it is subjected to the various changes of weather and temperature; and my improvement consists simply in shaving the said stubble off as closely as practicable to the original stalks whence the same were propagated, and then in covering the stubble with sufficient earth to protect them from the frost and changes to which otherwise they are liable to be exposed.

This process of shaving off the said stubble is performed as soon as convenient after the cane has been cut and removed from the fields for sugar-making purposes, and before the said stubble has in any manner been injured by the elements, whether by the air, sun, frost, or all combined.

The vitality of the stubble of sugar-cane, when subjected to the treatment above described, will be perfectly and thoroughly well preserved, so that in the early spring-time, upon the removal of the surplus earth from the same, so as to admit thereto the warm sun and air, the young sprouts will immediately start up and grow healthfully and vigorously.

The universal custom of leaving the said stalk or stubble exposed during the winter or cold season has the effect to destroy a very large proportion of the young sprouts, and it almost invariably occurs that much of the sugar-cane has to be replanted, thereby subjecting the planter to much labor and expense, whereas with my system the sprouts or roots are well preserved, and hence much time, money, and labor are saved.

My improvement therefore becomes of very great importance, not only to the sugar-planter, but to the public generally.

Having described my improvement, what I claim as new is—

The process of treating the stubble or stalks of sugar-cane, in the manner herein described, for the purposes set forth.

WM. GREEN.

Witnesses:
    H. N. JENKINS,
    F. MILLER.